United States Patent [19]

List

[11] Patent Number: 4,932,339
[45] Date of Patent: Jun. 12, 1990

[54] BULB AND BEDDING PLANTER

[76] Inventor: Joseph B. List, P.O. Box 5279, Hilton Head Island, S.C. 29928

[21] Appl. No.: 371,506

[22] Filed: Jun. 26, 1989

[51] Int. Cl.$^5$ .............................................. A01C 5/02
[52] U.S. Cl. ..................... 111/106; 111/92; 172/22
[58] Field of Search ............... 111/100, 101, 106, 115, 111/89, 99, 92, 95, 96, 97; 172/21, 22, 371, 377, 381

[56] References Cited

U.S. PATENT DOCUMENTS

| | | | |
|---|---|---|---|
| 1,692,436 | 11/1928 | Deane | 172/22 |
| 1,783,026 | 11/1930 | Ober | 172/22 |
| 1,887,796 | 11/1932 | Boere | 111/101 |
| 2,618,500 | 11/1952 | Peach | 111/101 |
| 3,202,120 | 8/1965 | Laffler | 111/96 |
| 3,210,112 | 10/1965 | Glynn | 172/22 |
| 3,273,930 | 9/1966 | Gottfried | 111/101 |
| 3,444,938 | 5/1969 | Ballmann | 172/22 |
| 3,506,296 | 4/1970 | Nelson | 111/101 |
| 4,585,072 | 4/1986 | Martinez | 111/106 |

FOREIGN PATENT DOCUMENTS

| | | | |
|---|---|---|---|
| 161795 | 3/1955 | Australia | 111/106 |
| 609506 | 4/1933 | Fed. Rep. of Germany | 111/99 |
| 981044 | 5/1951 | France | 111/92 |
| 1459312 | 11/1966 | France | 111/101 |
| 124937 | 4/1919 | United Kingdom | 111/92 |
| 211759 | 2/1924 | United Kingdom | 111/92 |

Primary Examiner—Danton D. DeMille
Attorney, Agent, or Firm—Michael A. Mann

[57] ABSTRACT

A bulb and bedding planter for the manual planting of bulbs, seedlings, and bedding plants in soil, comprising an elongated hollow tube with a handle at its upper end, and a substantially enclosed hollow plunger enclosure attached to the other end. The lower end of the enclosure terminates in a tip adapted to easily penetrate the soil; its upper end extends laterally, terminating in flanges which provide a foot rest for the operator. An elongated rod with a plunger handle at its upper end and a plunger at its lower end is slidably contained within said tube. Both the plunger handle and the plunger are of diameter slightly larger than the interior of said tube, thus limiting the motion of the rod within the tube. The planter can be used rapidly and efficiently by a standing operator, thereby reducing the bending and kneeling usually associated with this activity.

2 Claims, 3 Drawing Sheets

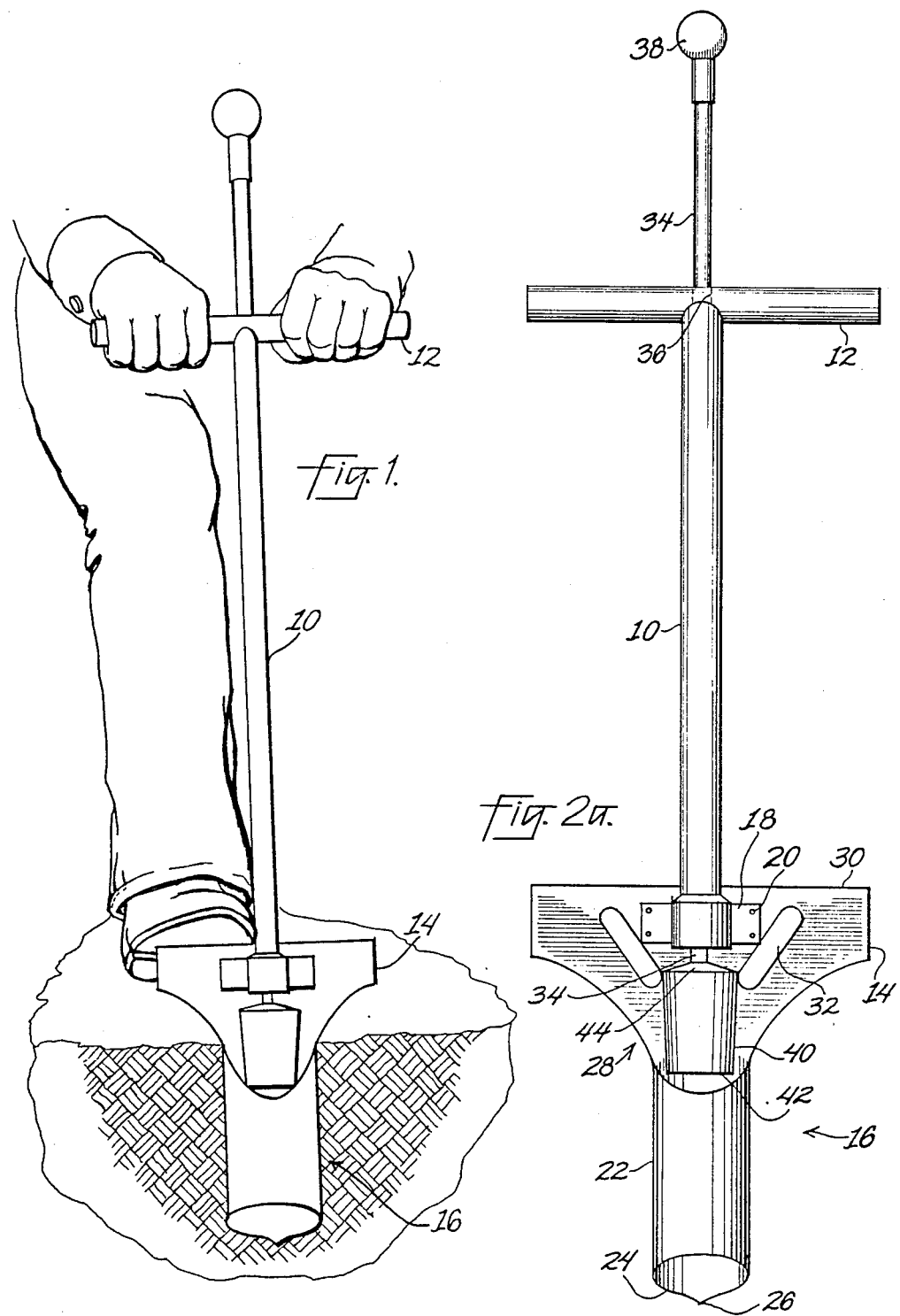

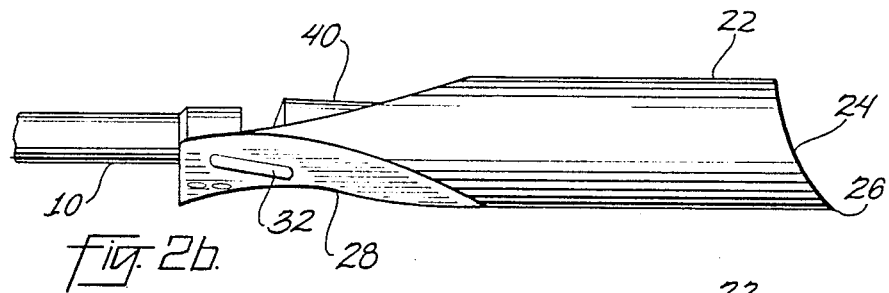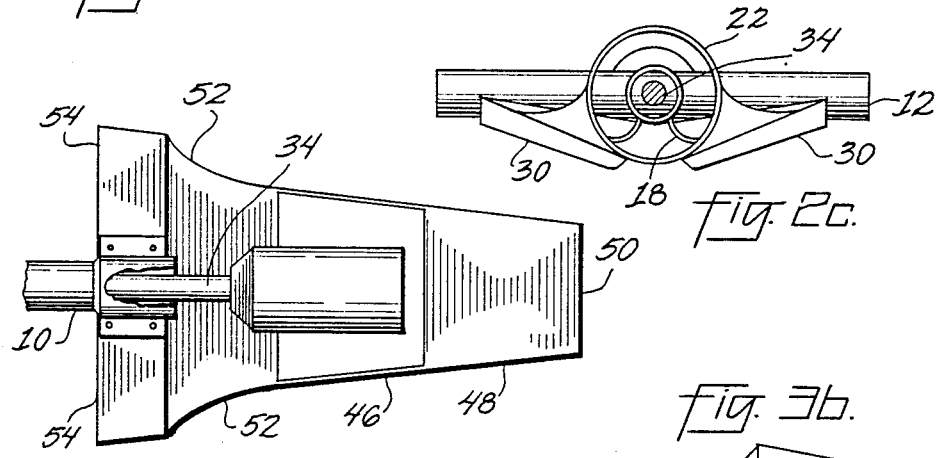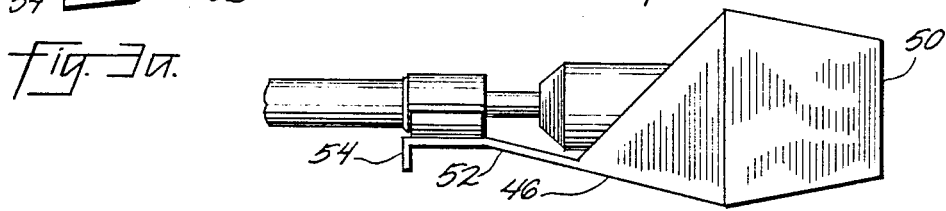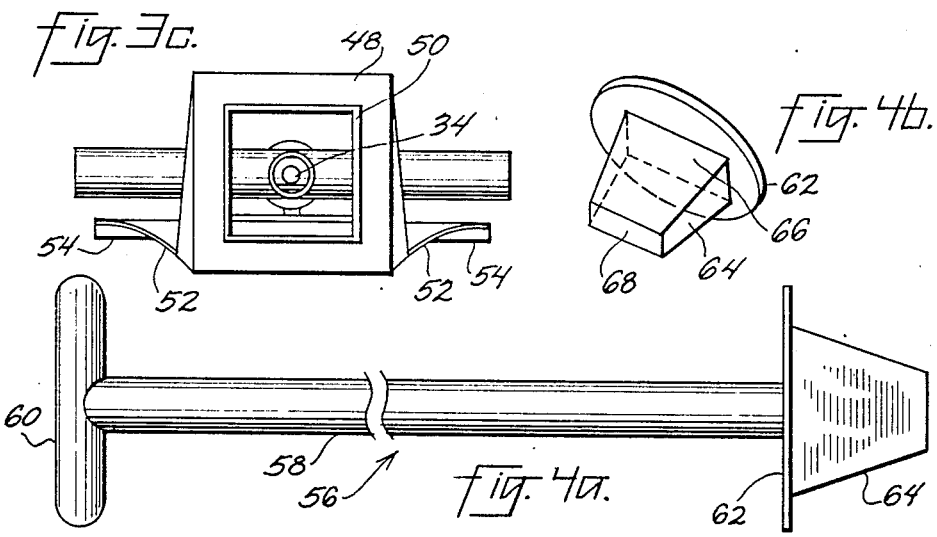

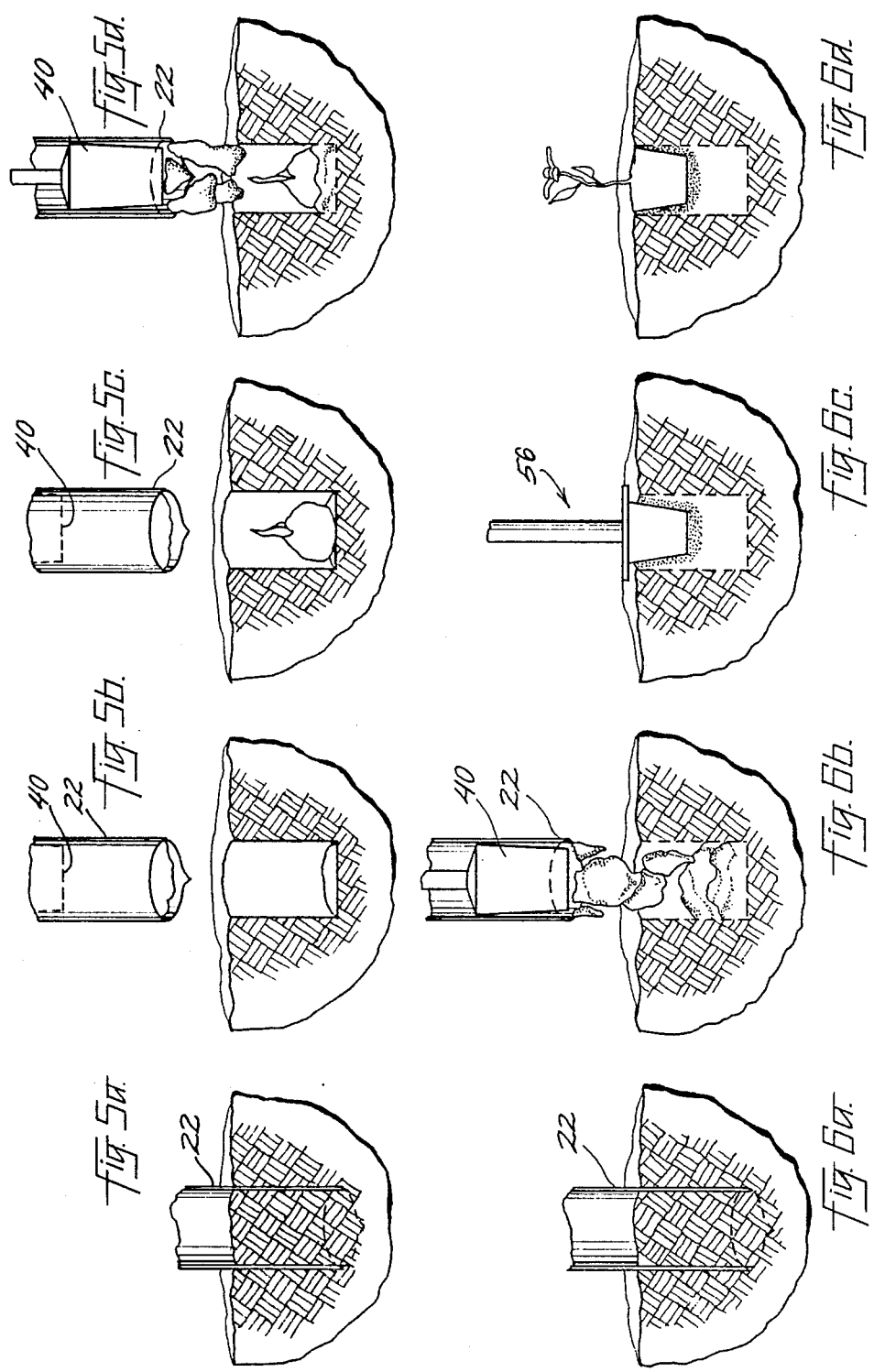

BULB AND BEDDING PLANTER

BACKGROUND OF THE INVENTION

1 Field of the Invention

The present invention relates to a device for manual planting of bulbs and seedlings.

2 Discussion of Background

Planting bulbs and seedlings necessitates frequent bending and kneeling by the gardener. The effort required can be particularly tiresome and fatiguing when a large number of seedlings are planted at the same time, or when the soil must be tilled prior to planting in order to better accommodate the growing root structure of the seedlings.

A number of devices to assist in planting bulbs and seedlings are known. One such device, disclosed in U.S. Pat. Ser. No. 1,771,694, designed for use by a standing operator, requires that each seedling be inserted into a holder before planting. Other devices have elongated, angled tubes, such as that disclosed in U.S. Pat. No. 4,082,048, through which a seedling may be dropped into a hole created by a movable dibble.

Yet another type of device for planting seedlings is disclosed in U.S. Pat. No. 3,797,417. This device has a dibble and a plant holder aligned with the planting hole and offset from the dibble. A hole is made in the soil with the dibble, then the plant and plant holder are lowered to the hole, and finally the device is retracted.

These devices are complicated to operate and contain a large number of moving parts which can become fouled with soil. Soil particles can cause moving parts to wear more quickly unless the implements are cleaned thoroughly and often. Proper operation of these devices presupposes that the soil has been prepared for receiving the plants, i.e. has been tilled.

SUMMARY OF THE INVENTION

An object of this invention is to provide a bulb and bedding planter for the rapid and efficient planting of bulbs and seedlings by an operator standing upright, reducing the amount of bending and kneeling usually associated with this activity.

Another object of this invention is to provide a bulb and bedding planter which is easily used in all types of soil by means of adjustable foot pressure by the operator.

Other objects of this invention are to provide a bulb and bedding planter which is of simple construction, inexpensive to manufacture, has few moving parts, is light in weight, efficient, durable, and easy to operate.

Accordingly, the present invention comprises a bulb and bedding planter for the manual planting of bulbs, seedlings, and bedding plants in soil, comprising an elongated hollow tube with a transverse handle at one end and a fitting at the other end. A hollow plunger enclosure is attached to the fitting. The lower digging portion of the plunger enclosure terminates in a tip adapted to easily penetrate the soil; its upper portion extends laterally, terminating in flanges to provide a foot rest for the operator to step on for assistance in penetrating the soil with the lower digging portion. The digging portion may be of round, square, or other substantially closed cross-section, as may be convenient.

An elongated rod with a plunger handle at its upper end and a plunger at its lower end is slidably contained within the hollow tube. The plunger has a lower end facing the soil, and an upper end attached to the lower end of the elongated rod. The plunger handle and the plunger are both of diameter larger than the interior of said tube, thus limiting the longitudinal motion of the rod within the tube. The digging portion of the plunger enclosure is larger than the plunger. The planter is of such length that it may be readily used by an operator standing substantially upright.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings:

FIG. 1 is a perspective drawing showing the bulb and bedding planter in use by a standing operator.

FIG. 2a shows a front view of the the bulb and bedding planter with a plunger enclosure having a digging portion with round cross-section according to an embodiment of the present invention.

FIG. 2b shows a side view of the enclosure according to the embodiment of FIG. 2a of the present invention.

FIG. 2c shows an end view of the enclosure according to the embodiment of FIG. 2a of the present invention.

FIG. 3a shows a front view of the bulb and bedding planter with a plunger enclosure having a digging portion with square cross-section according to another embodiment of the present invention.

FIG. 3b shows a side view of the embodiment of the enclosure of FIG. 3a.

FIG. 3c shows an end view of the embodiment of the enclosure of FIG. 3a.

FIG. 4a shows a side view of a dibble.

FIG. 4b shows a perspective view of the dibble head.

FIGS. 5a-5d illustrate the sequence of steps in the operation of the bulb and bedding planter for planting a bulb.

FIGS. 6a-6d illustrate the sequence of steps of the bulb and bedding planter for planting a seedling or bedding plant.

DETAILED DESCRIPTION OF THE INVENTION

FIG. 1 shows the bulb and bedding planter in use. Longitudinal hollow tube 10 has handle 12 extending transversely outwards from its upper end. The operator holds handle 12 and exerts foot pressure on one of flanges 14 of plunger enclosure 16 to facilitate insertion into the soil.

FIG. 2a shows plunger enclosure 16 in detail. Plunger enclosure 16 is fastened to fittings 18 of tube 10 by fastening means 20, which may be bolts, screws, or removable fastening means, as may be convenient. Alternatively, enclosure 16 may be fastened directly to tube 10. Plunger enclosure 16 comprises round, hollow digging portion 22, preferably of larger diameter than tube 10, cut away at lower end 24 to provide pointed tip 26 adapted to easily penetrate the soil. The upper portion 28 of enclosure 16 extends laterally and terminates in flanges 14, to provide a foot rest for the operator. Flanges 14 of upper portion 28 taper to digging position 22 as shown in FIG. 2. Flanges 14 may have lateral flange tops 30. Strengthening means 32 may be made part of enclosure 16, by attaching strengthening members or by incorporating topographic features in the material of flanges 14, as may be convenient. Strengthening means 32 are elongated topographic features perpendicular to the line of greatest stress in flanges 14.

Rod 34, slidably contained within tube 10 and longer than tube 10, extends outwards through opening 36 in handle 12, terminating at its upper end in handle 38 which is of some convenient size larger than opening 36. Plunger 40, of such diameter as may fit within digging portion 22, is attached to the lower end of rod 34. Plunger 40 is of larger diameter than tube 10, thus, with handle 38, containing the movement of rod 34 within tube 10. Plunger 40 has lower end 42 facing downwards towards the soil, and upper end 44 attached to the lower end of rod 34 by any convenient fastening means.

Side and end views of round plunger enclosure 16 are shown in FIGS. 2b and 2c, respectively. In the preferred embodiment, tube 10 is approximately 30 inches long, rod 34 is approximately 36 inches long, and the other parts are dimensioned accordingly to allow for easy use by a standing operator.

FIG. 3a shows an alternative embodiment of the plunger enclosure. Plunger enclosure 46 has lower, hollow digging portion 48 with square cross-section and end 50 adapted for insertion into soil. Flanges 52 extend outwards from digging portion 48 of enclosure 46, terminating in flange tops 54. Plunger enclosures taper from flange tops 54 to digging position 48 as seen in FIG. 3.

FIGS. 3b and 3c show side and end views of enclosure 46, respectively. The dimensions are approximately the same as those of the round plunger enclosure (FIGS. 2a-c), allowing for easy use by a standing operator.

As described in the preferred embodiment, the digging portion of the plunger enclosure is of round or square cross-section. It may, however, be of other substantially closed cross-section, as may be convenient.

FIG. 4a shows dibble 56 comprising a tube 58 fitted with a handle 60 extending transversely outwards from the upper end of dibble 56. Flange 62 is attached to the lower end of tube 58 by some fastening means. Flange 62 extends laterally outwards from tube 58, providing a foot rest for the operator. Dibble head 64 has rectangular upper cross-section 66 larger than rectangular lower cross-section 68, and is of such length as may be convenient to form a truncated pyramidal soil-penetrating member. Alternatively, dibble head 64 may have some other geometric cross-section, as may be convenient. Dibble head 64 is attached to tube 58 by bolts, screws, or other fastening means as may be convenient. While flange 62 is shown here as being circular, it may be of any convenient form.

The bulb and bedding planter is operated as follows: holding handle 12, the operator pushes round digging portion 22 (or, alternatively, square digging portion 46) into the soil by means of foot pressure on flange tops 30 to loosen a portion of soil, thereby filling digging portion 22 with soil (FIG. 5a).

To plant a bulb, the operator raises the planter from the soil by lifting handles 12 and 38 (FIG. 5b), and drops the bulb into the hole thus created (FIG. 5c. The operator then positions digging tube 22 over the hole and depresses plunger handle 38 sharply once or twice, thereby causing plunger 40 to expel soil from digging portion 22, refilling the hole and covering the bulb with loosened soil (FIG. 5d).

When planting bedding plants or seedlings, the operator proceeds as above, pushing digging portion 22 into the soil by means of foot pressure on flange tops 30, filling digging portion 22 with soil (FIG. 6a). The operator then raises digging portion 22 slightly and depresses plunger handle 38 sharply once or twice, causing plunger 40 to expel loosened soil into the hole (FIG. 6b). This process is repeated until enough spots have been formed to receive the plants. The operator then takes dibble 56 and presses dibble head 64 into the soil by gentle pressure on handle 60, leaving a precise form in the soil to receive the root ball of the plant (FIG. 6c). No filling or tamping is necessary, since the plant can now be placed into the preformed hole (Fig. 6d). Alternatively, soil can be expelled at some other location, leaving a hole for the plant without necessitating the use of dibble 56.

Use of the bulb and bedding planter eliminates most of the bending and kneeling usually associated with planting bulbs, seedlings, and bedding plants, rendering this process more simple and efficient than with other types of planters. It allows the operator to condition the soil in each individual planting area, eliminating the need to till the soil prior to planting. It can readily be used in all types of soil by means of adjustable foot pressure by the operator.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A bulb and bedding planter for the manual planting of bulbs, seedlings, and bedding plants in soil, comprising:

an elongated hollow tube having an upper end, a lower end, and an interior;

a hollow plunger enclosure attached to said lower end of said hollow tube, said enclosure having an upper portion extending laterally from said hollow tube to form flanges for pressing said planter into the ground with the foot of a user, said upper portion having side edges which taper laterally inward and downward to a substantially enclosed, lower digging portion, said upper portion having a means for strengthening said upper portion against foot pressure;

an elongated rod, slidably contained within said interior of said elongated hollow tube, having an upper end and a lower end, said elongated rod having a plunger handle attached to said upper end of said rod, said plunger handle being of diameter slightly larger than said interior, and a plunger having a diameter larger than said interior and dimensioned to fit within said digging portion, with a lower end and an upper end, said upper end attached to said lower end of said rod.

2. A method of planting plants in soil using a dibble and a bulb and bedding planter comprising a hollow plunger enclosure having a substantially enclosed digging portion and a plunger, said method comprising the steps of:

pushing said digging portion into said soil, thereby filling said digging portion with soil;

raising said bulb and bedding planter, thereby creating a planting hole;

moving said bulb and bedding planter slightly upwards from said hole and depressing said plunger sharply at least once, releasing loosened soil into said planting hole, thereby creating a planting area;

pressing a dibble head gently into said planting area, thereby forming a depression for receiving plant; and placing said plant into depression.

* * * * *